Nov. 27, 1945.   S. GILBERT   2,389,772
CLUTCH
Filed Aug. 8, 1944

INVENTOR.
Samuel Gilbert.
BY Robert F. Beck
ATTORNEY

Patented Nov. 27, 1945

2,389,772

UNITED STATES PATENT OFFICE 2,389,772

CLUTCH

Samuel Gilbert, Verona, N. J., assignor to Bendix Aviation Corporation, Teterboro, N. J., a corporation of Delaware Application August 8, 1944, Serial No. 548,559

4 Claims. (Cl. 192—69)

My invention relates to clutches and more particularly to clutch discs or plates.

In the construction of starter clutches or the like, it is common practice to provide the clutch packs with alternately arranged and relatively hard and soft plates or discs, for instance steel and bronze, the bronze discs being formed of powdered material. In this type of structure, considerable trouble has been experienced in the operation of the clutch pack for the reason that the clutch faces of the bronze discs are subjected to excessive wear which tends to develop undesirable "clutch-slippage." This excessive wear is occasioned by the abrasive character of comminuted material—or any abrasive foreign matter—adhering to the clutch faces, the comminuted material being derived from the clutch faces of the bronze discs by the action of the steel discs thereon.

One of the objects of my invention is to provide the clutch pack with discs equipped with means for collecting and discharging any material or foreign matter tending to accumulate upon the confronting or engaging faces of the discs and thereby preclude excessive wear thereof with resultant prolongation of their efficient use.

Another object of my invention is to provide a clutch disc of the foregoing described character which is simple in construction, durable in use, economical in manufacture, and efficient in operation.

Other objects and advantages will be apparent from a perusal of the specification and a study of the annexed drawing.

Referring to the drawing wherein like reference characters designate like parts throughout the several views.

Figure 1:
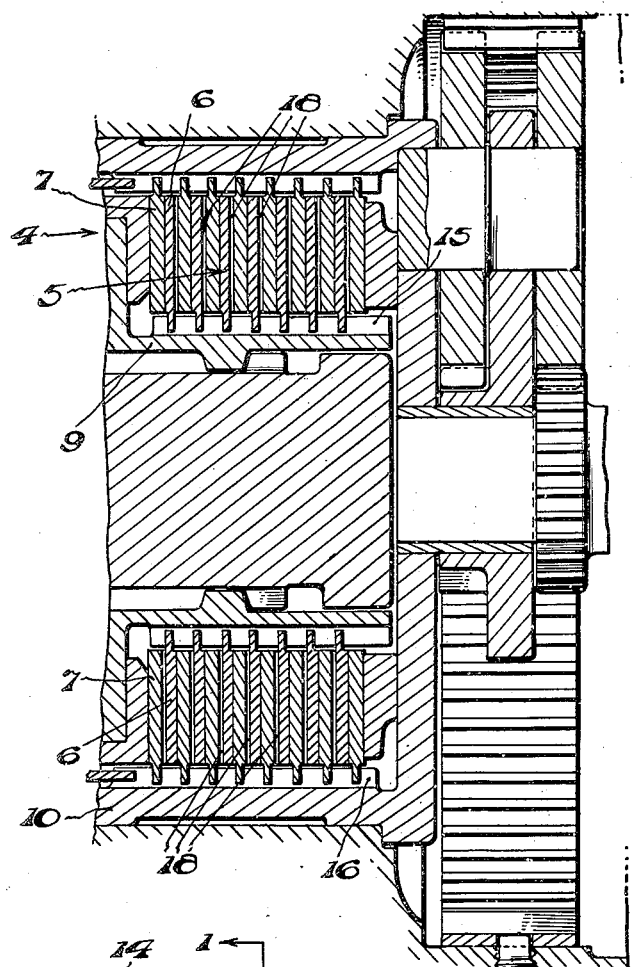
Figure 1 is a longitudinal section of a clutch assembly having my invention incorporated therein, said section being taken substantially on the line 1—1 of the clutch pack depicted in Figure 2.

As illustrated in the drawing, I provide a clutch assembly 4 of the type employing a clutch pack 5, the latter comprising a plurality of relatively hard and soft clutch discs or plates 6 and 7, respectively, each of which is formed with a central opening. The discs 6 are preferably constructed of steel, while the discs 7 are of bronze formed from powdered material. The discs 6 and 7 are alternately arranged and are splined to the clutch members 9 and 10 of the assembly and with the discs 6 and 7 being provided with spline ways 13 and 14 formed on their inner and outer peripheries for slidably receiving the spline keys 15 and 16 of the members 9 and 10, respectively. Inasmuch as the foregoing described clutch assembly forms no part of the present invention per se, the present disclosure is believed to be sufficient; reference being had to U. S. Patent No. 2,347,788 for a more detailed disclosure and one form of utilization.

Figure 2:
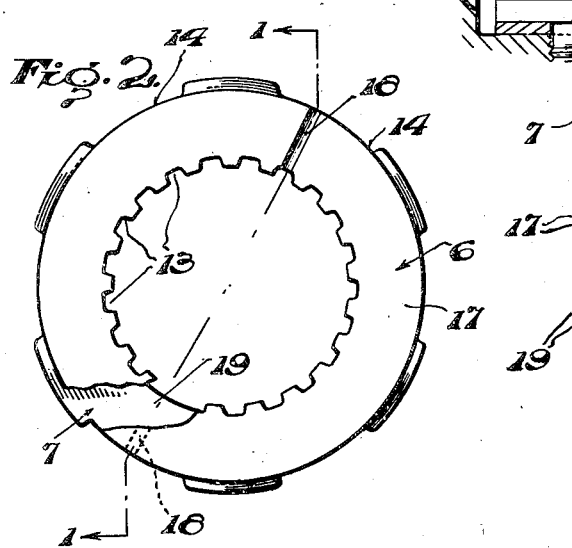
Figure 2 is an end elevation of a clutch pack having my novel form of discs incorporated therein, a fragment of the confronting disc being removed to expose a portion of the postjacent disc.
Figure 3:
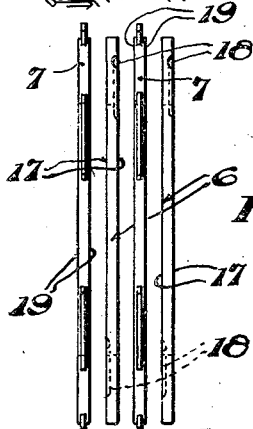
Figure 3 is an end elevation of a plurality of the discs, the later being shown in spatiality.

Each of the discs 6 is formed, on each of its radial faces 17, with a radially extending slot or groove 18 which entirely transverses that portion of the face between its outer and inner peripheries as clearly illustrated in Figure 2 of the drawing. When the discs 6 are assembled with the discs 7 to form the pack 5, the faces 17 are disposed for engagement with the opposite faces 19 of the adjacent discs 7. During relative rotation of the discs 6 and 7, the grooves 18 serve to collect any powder or foreign material tending to collect or adhere to the confronting clutch faces of the adjacent discs thereby eliminating excessive wear on the discs and thus prolonging their efficient use for a substantial period.

Without further elaboration the foregoing will so fully explain the invention that others may, by applying current knowledge, readily adapt the same for use under various conditions of service. Moreover, it is not indispensable that all the features of the invention be used conjointly since they may be employed advantageously in various combinations and sub-combinations.

It is obvious that the invention is not confined to the herein described use therefor as it may be utilized for any purpose to which it is adaptable. It is therefore to be understood that the invention is not limited to the specific construction as illustrated and described as the same is only illustrative of the principles of operation, which are capable of extended application in various forms, and that the invention comprehends all construction within the scope of the appended claims.

What is claimed is:

1. In a clutch pack, the combination of a clutch disc constructed of a relatively hard material, and a clutch disc constructed of a relatively soft and powdered material characterized by its abrasiveness when comminuted and its susceptibility to comminution when subjected to the clutching action of said first defined disc, said first defined disc being provided on its clutching face with a radially disposed slot for collecting and dispersing the comminuted material from said second defined disc to eliminate the abrasive wear on and prolong the effective use of said second defined disc.

2. In a clutch pack having a plurality of clutch discs each having a face for frictionally engaging the confronting face of an adjacent disc and with each alternate disc of said pack being constructed of a relatively hard material and each interjacent disc, between a pair of said alternate disks, being constructed of a relatively soft and powdered material characterized by its abrasiveness when comminuted and its susceptibility to comminution when subjected to the clutching action of an alternate disc, each alternate disc being provided on each confronting face with a radially disposed slot for collecting and dispersing the comminuted material from the pack to eliminate the abrasive wear on and prolong the effective use of the interjacent discs.

3. In a clutch pack, the combination of a steel disc and a bronze disc, the latter being characterized by its abrasiveness when comminuted and its susceptibility to comminution when subjected to the clutching action of said steel disc, said steel disc being provided on its clutching face with a radially disposed slot for collecting and dispersing the comminuted material from said bronze disc to eliminate the abrasive wear on and prolong the effective use of said bronze disc.

4. In a clutch pack having a plurality of clutch discs each having a face for frictionally engaging the confronting face of an adjacent disc and with each alternate disc of said pack being constructed of steel and each interjacent disc, between a pair of said alternate discs, being constructed of powdered bronze characterized by its abrasiveness when comminuted and its susceptibility to comminution when subjected to the clutching action of a steel disc, each steel disc being provided on each confronting face with a radially disposed slot for collecting and dispersing the comminuted material from the bronze discs to eliminate the abrasive wear on and prolong the effective use of the bronze discs.

SAMUEL GILBERT.